United States Patent
Woodward et al.

(10) Patent No.: US 6,814,885 B2
(45) Date of Patent: Nov. 9, 2004

(54) SCALE AND CORROSION INHIBITORS

(75) Inventors: Gary Woodward, Cheshire (GB); Graham Philip Otter, Birmingham (GB); Keith Philip Davis, Staffordshire (GB); Robert Eric Talbot, Staffordshire (GB)

(73) Assignee: Rhodia Consumer Specialties Limited, Watford (GB)

( * ) Notice: Subject to any disclaimer, the term of this patent is extended or adjusted under 35 U.S.C. 154(b) by 0 days.

(21) Appl. No.: 10/259,000

(22) PCT Filed: May 3, 2001

(86) PCT No.: PCT/GB01/01939

§ 371 (c)(1),
(2), (4) Date: Dec. 30, 2002

(87) PCT Pub. No.: WO01/85616

PCT Pub. Date: Nov. 15, 2001

(65) Prior Publication Data

US 2003/0141486 A1 Jul. 31, 2003

(30) Foreign Application Priority Data

May 5, 2000 (GB) .............................. 0010763
Jan. 9, 2001 (GB) .............................. 0100485

(51) Int. Cl.$^7$ ............................ C02F 5/14; C23F 11/00; C07F 9/38
(52) U.S. Cl. ............... 252/180; 252/389.2; 252/389.23; 507/237; 558/117; 558/118
(58) Field of Search ................ 282/180, 389.2, 282/389.23; 507/237; 562/24; 568/10; 558/117, 118

(56) References Cited

U.S. PATENT DOCUMENTS

| | | | | |
|---|---|---|---|---|
| 3,032,578 A | * | 5/1962 | MacMullen et al. | .......... 562/23 |
| 3,760,038 A | | 9/1973 | Lewis | |
| 3,965,147 A | | 6/1976 | Hendricks | |
| 5,312,953 A | * | 5/1994 | Carter et al. | ................. 558/87 |
| 5,800,732 A | | 9/1998 | Lyle et al. | |

FOREIGN PATENT DOCUMENTS

| | | |
|---|---|---|
| EP | 0 491 391 A | 6/1992 |
| EP | 0 711 733 A | 5/1996 |

OTHER PUBLICATIONS

Derwent Publications Ltd., London, GB; AN 1990–079162, XP002187590 of JP 02 031894 A (1990), (week 199011).

* cited by examiner

*Primary Examiner*—Daniel S. Metzmaier
(74) *Attorney, Agent, or Firm*—Frishauf, Holtz, Goodman & Chick, P.C.

(57) ABSTRACT

A scale and corrosion inhibitor for use in the treatment of water comprises at least one oxyalkylene unit and at least one phosphonate unit (e.g. a unit derived prom a mono- or di-phosphonic acid such as VPA or VDPA). Inhibitors according to the present invention have been found to exhibit both scale-inhibiting and corrosion-inhibiting properties, especially in the treatment of cooling water and water used in oilfield applications.

8 Claims, No Drawings

SCALE AND CORROSION INHIBITORS

This application is a U.S. National Phase Application under 35 USC 371 of International Application PCT/GB01/01939 (published in English) filed May 3, 2001, which is incorporated herein by reference in its entirety.

This invention relates to scale and corrosion inhibitors for use in the treatment of water. The present invention will be described herein with particular reference to the treatment of water used for cooling in the course of industrial or chemical processes and water used in oilfield applications, although it is not to be construed as being limited thereto.

Efficient cooling is a vital part of many industrial and chemical processes. This is best achieved by the circulation of water through a heat-exchanger (e.g. cooling coils or a jacket) which, for maximum efficiency, should ideally be kept completely free of corrosion or scale deposits that can otherwise impair heat transfer.

Cooling water systems can be of the "once-through" or "evaporative recirculating" type. The latter type is much preferred, because the high enthalpy of vaporisation of water makes more efficient use of each unit mass of water passing through the system—when compared with simply using its thermal capacity—leading to reduced water usage and hence lower chemical treatment, water-supply and disposal costs.

The cost savings are maximised by operating at high recycle rates, often termed "cycles of concentration" or "concentration factor/ratio", (hereinafter CR). This can have the additional benefit of reducing the corrosivity of the cooling water, because the expulsion of carbon dioxide from the system leads to higher pH. However, the formation of insoluble mineral deposits, "scale", particularly calcium and basic magnesium carbonates, is promoted by the increased concentrations of $Ca^{++}$ and $Mg^{++}$ ions and the high pH. Also, calcium sulphate can be problematic at high concentration ratios. Furthermore, the thermodynamic and kinetic factors tend to favour scale deposition in the hottest parts of the system, ie, the heat exchanger, where efficient removal of heat is most critical.

For these reasons, while the industry recognises the benefits of operating at high 'CR' values, this has often been compromised by the practical limit imposed by the increasing concentration of dissolved salts, particularly those which are potentially scale-forming.

The application of compounds, "Scale Inhibitors", which are capable of inhibiting crystal nucleation and/or retarding the growth of scale forming minerals when applied in sub-stoichiometric amounts, is one approach which has been used successfully for many years. However, the currently—used scale inhibitors have limits in terms of the maximum scaling potential (and hence 'CR') that may be supported.

Thus, there is a widely-recognised need in the water treatment industry for new scale inhibitors, capable of operating under severe scaling conditions, to reduce the cost and the environmental impact of scaling. The impetus for this is most apparent in the industrially—developed countries, where lack of good quality water and increasingly restrictive environmental legislation have combined to force users to operate cooling systems under increasingly severe scaling conditions which are at the limit of existing technology.

Even where compounds are highly cost-effective scale inhibitors, further constraints are imposed by the need for them to be thermally and hydrolytically stable, safe for operators to use, environmentally acceptable, and compatible with high levels of scaling cations and also other chemicals that may be added to the system, e.g. corrosion inhibitors, and biocides, both non-oxidising and, notably, oxidising biocides.

The applicant has found that the criteria listed in the immediately—preceding paragraph may be met by the use of scale inhibitors which comprise both oxyalkylene units and phosphonate units.

The applicant has also found that such inhibitors can also be used to inhibit corrosion caused by (or exacerbated by) water.

Accordingly, the present invention provides a scale inhibitor or corrosion inhibitor for use in the treatment of water, said inhibitor comprising at least one oxyalkylene unit and at least one phosphonate unit.

Each oxyalkylene unit may conveniently be derived from a dihydric or polyhydric alcohol. Suitable examples of such alcohols include ethylene glycol, propylene glycol, oligomers and higher polymers of those glycols (such as tri-ethylene glycol, tetra-ethylene glycol, poly(oxyethylene) glycol and poly(oxypropylene) glycol) as well as mixtures or copolymers of any two or more of said alcohols.

Each phosphonate unit may conveniently be derived from a mono- or di-phosphonic acid. Suitable examples of such acids include vinyl phosphonic acid (VPA) and vinylidene-1,1-di-phosphonic acid (VDPA).

Alternatively, each phosphonate unit may be derived from a salt of a mono- or di-phosphonic acid.

In a particularly preferred embodiment, the present invention provides a scale or corrosion inhibitor having the general formula:

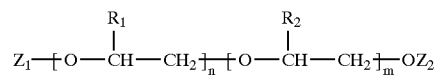

In the formula, $R_1$ and $R_2$ (which may be the same or different) denote H, alkyl, aryl, or alkoxy and (n+m)=1 to 100, to form a homo-, random mixed or block co-polymer;

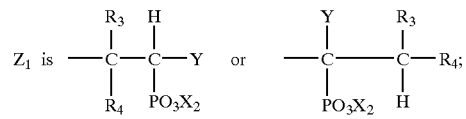

$Z_2$ is H, alkyl, aryl or $Z_1$;
$R_3$ and $R_4$ are each independently alkyl, aryl, alkoxy, or H; Y is $PO_3X_2$, alkyl, aryl, alkoxy or H;
X is alkyl, H, alkali metal, or amine salt.

Thus, an inhibitor according to the present invention may consist essentially of the reaction product of an oligomeric oxyalkylene glycol (e.g. triethylene glycol or tetra-ethylene glycol) and a di-phosphonic acid (e.g. vinylidene-1,1-di-phosphonic acid).

Alternatively, inhibitors according to the present invention may consist essentially of the reaction product of an alkylene oxide (e.g. ethylene oxide or propylene oxide) with a hydroxy-phosphonate (or its salt or ester) having the general formula:

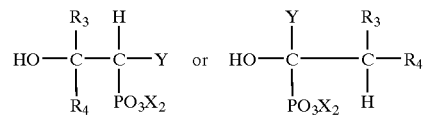

wherein $Z_2$ is H, alkyl, aryl or $Z_1$;
$R_3$ and $R_4$ are each independently alkyl, aryl, alkoxy, or H;
Y is $PO_3X_2$, alkyl, aryl, alkoxy or H;
X is alkyl, H, alkali metal, or amine salt.

For example, the hydroxy phosphonate may comprise 1-hydroxyethane-1, 1-diphosphonic acid (HEDP). Inhibitors according to the present invention have been found to be particularly effective in the treatment (for scale inhibition) of water containing upwards of 600 ppm alkaline earth metal ions, expressed as ppm calcium carbonate.

The present invention also provides a method of treating water, said method comprising the addition thereto of an effective amount of an inhibitor according to the present invention, as hereinbefore described.

The water may be, for example, cooling water, oilfield water, water used in paper manufacture, water in a hydraulic system, water in a desalination system (including membrane—process and evaporative process desalination systems), boiler water, geothermal water or water in an irrigation system.

Under optimum conditions of use, the inhibitors according to the present invention are at least partially biodegradable.

EXAMPLE 1

Preparation of the Reaction Product of Triethylene Glycol and VDPA

To vinylidene-1,1-di-phosphonic acid (VDPA, 5 g, 80% w/w, 85% pure) in a 30 ml sample tube was added triethylene glycol (2.70 g, 0.018 mol). The mixture was stirred with a spatula and placed in an oven at 90° C. After 24 hours a sample was taken from the reaction mixture and analysed by $^{31}$P-NMR which showed that 25% of the VDPA remained. After a further 72 hours at 90° C. a second sample was taken and analysed by $^{31}$P-NMR, still 15% VDPA remained but the reaction was concluded as being complete. The reaction mixture was left to cool to room temperature.

It is believed that a significant proportion of the foregoing reaction product has the following formula:

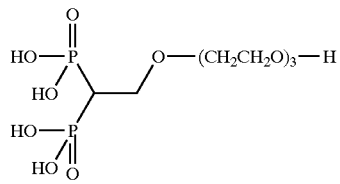

EXAMPLE 2

Calcium Carbonate Scale Test

Apparatus:
500 ml triple-neck round-bottomed flask fitted with combination pH electrode and ATC temperature probe. Thermostatically controlled water bath. Vacuum Filtration Apparatus The flask contents are stirred using a magnetic stirrer bar, which is rotated by a submersible drive unit. An autotitrator/pH-stat apparatus ('Radiometer PHM290') is used to adjust the pH.

Stock Solutions:

| | |
|---|---|
| "Cations" | 2.350 g/l CaCl$_2$.2H$_2$O + 0.985 g/l MgSO$_4$.7H$_2$O |
| "Bicarbonate Alkalinity" | 2.686 g/l NaHCO$_3$ |
| Inhibitor Solution | 10,000 mg/1 as "actives" |
| Titrant (pH adjustment) | Molar NaOH |

Method
1. 250 ml of "Cation" solution is placed in the 500 ml flask.
2. An appropriate volume of inhibitor stock solution is added to give the desired concentration.
3. 250 ml of "Bicarbonate Alkalinity" solution is added with stirring.
4. The pH of the test solution is adjusted to a pH value of 9.000±0.005 @ 25.0° C.
5. The flask is quickly immersed in the water bath, which is set to maintain a temperature of 50.0±0.1° C., and the pH, and temperature are logged to a computer for a period of 4000 seconds. This enables any time-dependent behaviour to be observed.
6. At the end of time, the flask is removed from the bath and the contents rapidly filtered whilst hot through a 0.45 micron "Millipore" filter.
7. The filtrate is "stabilised" with respect to further precipitation of calcium carbonate by the addition of 0.5 ml of concentrated hydrochloric acid to give a pH of approximately 6.0 @ 25.0° C.
8. The filtrate is then analysed by inductively-coupled plasma optical emission spectroscopy to determine the residual calcium and magnesium ion concentrations.
9. A "Blank" value is determined by repeating the procedure in the absence of inhibitor. A "Control" sample is also prepared by mixing equal volumes of the "Cation" and "Bicarbonate Alkalinity" solutions in the presence of a stabilising amount of hydrochloric acid.
10. The degree of scale inhibition provided by the inhibitor compound is then calculated as follows:

% Inhibition=[(Ca$_{(test)}$−Ca$_{(blank)}$/(Ca$_{(control)}$−Ca$_{(blank)}$)]×100

EXAMPLE 3

The degree of scale inhibition (as hereinbefore defined) was determined for two scale inhibitors according to the present invention and compared to the degree of scale inhibition achieved by a commercially-available, bleach-stable inhibitor. The results of said determinations are given in the TABLE below:

TABLE

| TEST No | Inhibitor (Identity and concentration in ppm) | % Inhibition |
|---|---|---|
| A | Tetra-ethylene glycol/VDPA, 75 ppm | 66.80 |
| B | Tri-ethylene glycol/VDPA, 50 ppm | 62.66 |
| C* | Phosphonobutane-tricarboxylic acid, 50 ppm | 50.21 |

*Available under the Registered Trade Mark BAYHIBIT.

What is claimed is:

1. A scale inhibitor or corrosion inhibitor for the treatment of water, said inhibitor comprising at least one oxyalkylene unit and at least one phosphonate unit and having the formula

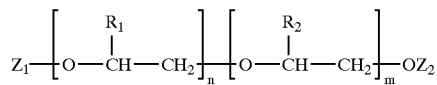

wherein R$_1$ and R$_2$, which may be the same or different, are each selected from the group consisting of H, alkyl, aryl, and alkoxy; (n+m)=1 to 100, to form a homo-random mixed or block co-polymer;

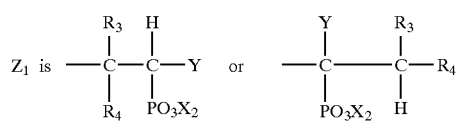

Z$_2$ is selected from the group consisting of H, alkyl, aryl, or Z$_1$,

R₃ and R₄ are each independently selected from the group consisting of alkyl, aryl, alkoxy, and H;

Y is $PO_3X_2$; and

X is selected from the group consisting of alkyl, H, alkali metal, and amine salts.

2. The inhibitor of claim 1, wherein said at least one oxyalkylene unit is derived from a dihydric or polyhydric alcohol.

3. The inhibitor of claim 2, wherein said at least one oxyalkylene unit is derived from a dihydric or polyhydric alcohol selected from the group consisting of ethylene glycol, propylene glycol, oligomers of said alycols, higher polymers of said glycols, tn-ethylene glycol, tetra-ethylene glycol, poly (oxyethylene) glycol, poly(oxypropylene) glycol, mixtures of at least two of said cilycols and copolymers of at least two of said glycols.

4. The inhibitor of claim 1, wherein said at least one phosphonate unit is derived from a mono- or di-phosphonic acid.

5. The inhibitor of claim 4, wherein said at least one phosphonate unit is derived from vinylidene-1,1-diphosphonic acid (VDPA).

6. The inhibitor of claim 1, said inhibitor consisting essentially of the reaction product of tri-ethylene glycol or tetra-ethylene glycol and vinylidene-1,1-diphosphonic acid (VDPA).

7. The inhibitor of claim 1, said inhibitor consisting essentially of the reaction product of an alkylene oxide with a hydroxy-phosphonate, salt of said hydroxy-phosphonate or ester of said hydroxy-phosphonate, said hydroxy-phosphonate having the formula:

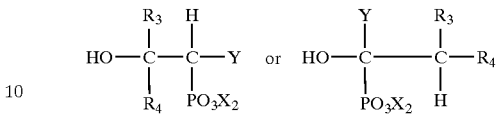

wherein R3 and R4 are each independently selected from the group consisting of alkyl, aryl, alkoxy, and H;

Y is $PO_3X_2$; and

X is selected from the group consisting of alkyl, H, alkali metal, and amine salts.

8. The inhibitor of claim 7, wherein said hydroxy-phosphonate is 1-hydroxyethane-1,1 diphosphonic acid (HEDP).

* * * * *